US011632601B1

(12) United States Patent
Galor Gluskin et al.

(10) Patent No.: US 11,632,601 B1
(45) Date of Patent: Apr. 18, 2023

(54) USER INTERFACE FOR CAMERA FOCUS

(71) Applicant: QUALCOMM Incorporated, San Diego, CA (US)

(72) Inventors: Micha Galor Gluskin, San Diego, CA (US); Ho Sang Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/454,547

(22) Filed: Nov. 11, 2021

(51) Int. Cl.
H04N 5/262 (2006.01)
H04N 23/63 (2023.01)
G06T 5/00 (2006.01)
G06T 7/50 (2017.01)
H04N 23/67 (2023.01)
G06F 3/0488 (2022.01)
G06F 3/04842 (2022.01)

(52) U.S. Cl.
CPC .......... H04N 23/632 (2023.01); G06T 5/002 (2013.01); G06T 7/50 (2017.01); H04N 5/2628 (2013.01); H04N 23/633 (2023.01); H04N 23/675 (2023.01); G06F 3/0488 (2013.01); G06F 3/04842 (2013.01)

(58) Field of Classification Search
CPC ....... H04N 5/232935; H04N 5/232127; H04N 5/232939; H04N 5/2628; G06T 5/002; G06T 7/50; G06F 3/04842; G06F 3/0488
See application file for complete search history.

(56) References Cited

U.S. PATENT DOCUMENTS

| 2008/0012943 | A1 | 1/2008 | Watanabe et al. |
| 2011/0227950 | A1 | 9/2011 | Suzuki |
| 2012/0007942 | A1* | 1/2012 | Michrowski ........... H04N 5/272 348/E7.083 |
| 2012/0069235 | A1 | 3/2012 | Imai |
| 2015/0189154 | A1 | 7/2015 | Laroia et al. |
| 2016/0117829 | A1* | 4/2016 | Yoon ................... H04N 5/23232 348/222.1 |
| 2017/0201674 | A1* | 7/2017 | Yamamoto ....... H04N 5/232945 |
| 2017/0318226 | A1 | 11/2017 | Jung et al. |

(Continued)

FOREIGN PATENT DOCUMENTS

| JP | 2013126177 A | 6/2013 |
| JP | 2013142725 A | 7/2013 |
| WO | 2012154585 A1 | 11/2012 |

OTHER PUBLICATIONS

International Search Report and Written Opinion—PCT/US2022/042045—ISA/EPO—dated Dec. 9, 2022 (11 pp).

*Primary Examiner* — Padma Haliyur
(74) *Attorney, Agent, or Firm* — Shumaker & Sieffert, P.A./Qualcomm

(57) ABSTRACT

A device for image capture includes a memory configured to store a preview image, and one or more processors coupled to the memory and configured to receive a user selection to focus at a region of the preview image stored in the memory, determine whether there is image content at different depths in the region, based on the determination that there is image content at different depths in the region, output an alternative version of the image content in the region, receive a subsequent user selection within the alternative version, and control a focus level for a camera based on the subsequent user selection.

26 Claims, 10 Drawing Sheets

(56) References Cited

U.S. PATENT DOCUMENTS

| | | |
|---|---|---|
| 2018/0070006 A1 | 3/2018 | Katayama |
| 2018/0143511 A1* | 5/2018 | Jannard .................. G03B 13/18 |
| 2018/0278837 A1 | 9/2018 | Lee et al. |
| 2018/0295292 A1 | 10/2018 | Lee et al. |
| 2020/0177818 A1 | 6/2020 | Kagaya et al. |
| 2020/0380289 A1 | 12/2020 | Jagadeesh et al. |

* cited by examiner

USER INTERFACE FOR CAMERA FOCUS

TECHNICAL FIELD

The disclosure relates to capture or image processing.

BACKGROUND

A camera device includes one or more cameras that capture frames (e.g., images). Examples of the camera device include stand-alone digital cameras or digital video camcorders, camera-equipped wireless communication device handsets, such as mobile telephones having one or more cameras, cellular or satellite radio telephones, camera-equipped personal digital assistants (PDAs), computing panels or tablets, gaming devices, computer devices that include cameras, such as so-called "web-cams," smartwatch, a device equipped with own camera, a device configured to control another device equipped with a camera, or any device with digital imaging or video capabilities.

A camera device processes the captured frames and outputs the frames for display. In some examples, the camera device controls the exposure, focus, and white balance to capture high quality images.

SUMMARY

In general, this disclosure describes techniques for controlling a camera focus level (e.g., position of a lens of the camera to focus at the desired depth), including techniques for generating a user interface with which a user interacts to control the camera focus level. As described in more detail, in response to a user selection of a region to focus in a preview image, one or more processors may determine whether there is image content at different depths in the region. If there is image content at different depths in the region, the one or more processors may output an alternative version (e.g., zoomed in version) of the image content in the region, and receive a subsequent user selection within the alternative version. The one or more processors may control the focus level for a camera (e.g., lens position of the camera) based on the subsequent user selection. However, if there is image content at a single depth (e.g., not image content at different depths) in the region, the one or more processors may not output an alternative version of the image content in the region, and may control the focus level for the camera based on the user selection (i.e., no subsequent user selection is needed).

In some cases, a user selection of a region to control the focus level of the camera may cover a relatively large region. For example, the user may touch the screen presenting the preview image to define a region. On a relatively small screen, the touch on the screen may encompass a relatively large amount of image content (e.g., the area is proportional to a ratio between the size of the screen and the user perceived size of the fingertip, which may be how the user touched the screen). In such cases, it may be undefined exactly where the focus of the camera should be, especially in cases where there is image content at different depths. That is, the depth of the focus may be unknown as there is image content at different depths in the user selected region. By zooming in on image content of the region where there is image content of different depths, the user may be able to better select where the camera should focus because the image content of the region appears much larger on the screen. However, if there is image content at a single depth (e.g., there is not image content at different depths), then the focus can be adjusted (e.g., by changing the lens position) to the depth of the image content in the user selected region without needing to zoom in on the image content of the region. In this way, the example techniques may improve the operation of controlling focus level on a camera with a practical application to selectively provide alternative versions to better select the focus depth in cases where there is image content at different depths.

In one example, a device for image capture includes: a memory configured to store a preview image; and one or more processors coupled to the memory and configured to: receive a user selection to focus at a region of the preview image stored in the memory; determine whether there is image content at different depths in the region; based on the determination that there is image content at different depths in the region, output an alternative version of the image content in the region; receive a subsequent user selection within the alternative version; and control a focus level for a camera based on the subsequent user selection.

In one example, a method for image capture includes: receiving a user selection to focus at a region of the preview image stored in the memory; determining that there is image content at different depths in the region; based on the determination that there is image content at different depths in the region, outputting an alternative version of the image content in the region; receiving a subsequent user selection within the alternative version; and controlling a focus level for a camera based on the subsequent user selection.

In one example, a computer-readable storage medium storing instructions thereon that when executed cause one or more processors to: receive a user selection to focus at a region of the preview image stored in the memory; determine that there is image content at different depths in the region; based on the determination that there is image content at different depths in the region, output an alternative version of the image content in the region; receive a subsequent user selection within the alternative version; and control a focus level for a camera based on the subsequent user selection.

The details of one or more examples are set forth in the accompanying drawings and the description below. Other features, objects, and advantages will be apparent from the description, drawings, and claims.

DETAILED DESCRIPTION

Figure 1:
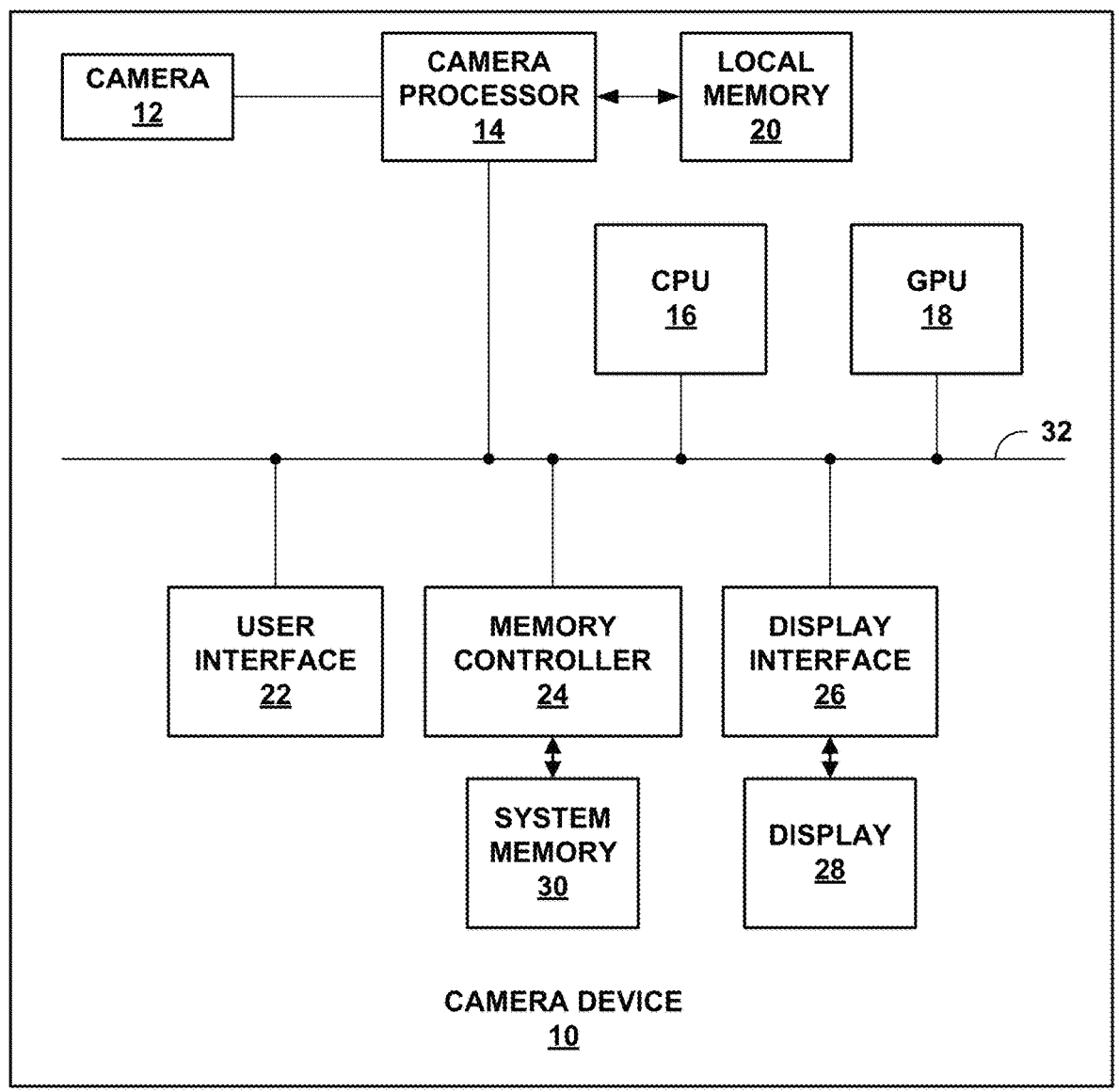
FIG. 1 is a block diagram of a device configured to perform one or more of the example techniques described in this disclosure.

The example techniques described in this disclosure relate to camera focus (e.g., depth where a camera should focus for image or video capture). For some focus techniques of a camera, a user selects a region where to focus. For example, during preview mode, a screen displays image content to be captured. A preview image may include the image content. The user may touch on the screen at the region of the preview image where a camera is to focus. However, in some examples, there may be image content at different depths in the user selected region (e.g., where the user touched). In such cases, it may be unclear the depth at which the focus is to be set (e.g., it may be unclear the focus level, and what the focus level should be adjusted to).

In one or more examples, in response to a user selection of a region of the preview image where to focus, one or more processors may determine if there is image content at multiple depths in the selected region. If there is image content at multiple depths, the one or more processors may implement a focus assist process to allow the user to more accurately select the focus depth and the image content on which to focus. If, however, there is image content at only one depth, the one or more processors may control the focus level so that the focus is at the depth and region of the selected region.

In cases where there is image content at multiple depths, in some examples, the screen may present an alternative version of the image content. As one example, the alternative version of the image content may be a zoomed in image content of the selected region so that the selected region appears larger. In this alternative version of the image content, the user may then again select the region where to set the depth. For instance, in the zoomed in version of the image content, the user may again select the region of where to set the depth giving the user a more precise way in which to select the focus depth.

As another example, after presenting the alternative version of the image content, the user may manually adjust the focus of the camera until the desired image content is in focus. In some examples, for manually adjusting the focus level (e.g., depth at which the camera is to focus), the screen may display a histogram that illustrates the number of pixels that are further or closer than the focus depth. The user may utilize the histogram to select if the user would like to focus on image content closer to or further away from the focal point. However, the example techniques do not require a histogram to be present.

Accordingly, one or more processors may be configured to receive a user selection to focus at a region of a preview image and determine whether there is image content at different depths in the region. Based on there being image content at different depths in the region, the one or more processors may output an alternative version (e.g., zoomed in version) of the image content in the region. In such examples, the one or more processors may receive a subsequent user selection within the alternative version and control (e.g., set or adjust) a focus level (e.g., lens position) for a camera based on the subsequent user selection. However, based on there not being image content at different depths in the region, the one or more processors may control a focus level for the camera based on the user selection (e.g., there may be no outputting of an alternative version of the image content or receiving a subsequent user selection). For example, to control the focus level, the one or more processors may adjust the position of the lens of the camera without receiving the subsequent user selection.

There may be various examples of the subsequent user selection. As one example, the subsequent user selection may be a user selection of a sub-region within the region. For instance, because the image content of the region is zoomed in, as an example, the user may be able to better select a sub-region that defines the depth of the focus of the camera. As another example, the subsequent user selection may be a user selection to control the focus level manually (e.g., manually focus position of the lens). For instance, the user may manually adjust the focus level to the desired focus depth.

FIG. 1 is a block diagram of a device configured to perform one or more of the example techniques described in this disclosure. Examples of camera device 10 include stand-alone digital cameras or digital video camcorders, camera-equipped wireless communication device handsets, such as mobile telephones having one or more cameras, cellular or satellite radio telephones, camera-equipped personal digital assistants (PDAs), computing panels or tablets, watches, gaming devices, computer devices that include cameras, such as so-called "web-cams," or any device with digital imaging or video capabilities.

As illustrated in the example of FIG. 1, camera device 10 includes camera 12 (e.g., having an image sensor and lens), camera processor 14 and local memory 20 of camera processor 14, a central processing unit (CPU) 16, a graphical processing unit (GPU) 18, user interface 22, memory controller 24 that provides access to system memory 30, and display interface 26 that outputs signals that cause graphical data to be displayed on display 28. Although the example of FIG. 1 illustrates camera device 10 including one camera 12, in some examples, camera device 10 may include a plurality of cameras, such as for omnidirectional image or video capture.

Also, although the various components are illustrated as separate components, in some examples the components may be combined to form a system on chip (SoC). As an example, camera processor 14, CPU 16, GPU 18, and display interface 26 may be formed on a common integrated circuit (IC) chip. In some examples, one or more of camera processor 14, CPU 16, GPU 18, and display interface 26 may be in separate IC chips. Additional examples of components that may be configured to perform the example techniques include a digital signal processor (DSP), a vector processor, or other hardware blocks used for neural network (NN) computations. Various other permutations and combinations are possible, and the techniques should not be considered limited to the example illustrated in FIG. 1.

The various components illustrated in FIG. 1 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Examples of local memory 20 and system memory 30 include one or more volatile or non-volatile memories or storage devices, such as random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 1 communicate with each other using bus 32. Bus 32 may be any of a variety of bus structures, such as a third generation bus (e.g., a Hyper-Transport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. The specific configuration of buses and communication interfaces between the different components shown in FIG. 1 is merely exemplary, and other configurations of camera devices and/or other image processing systems with the same or different components may be used to implement the techniques of this disclosure.

Camera processor 14 is configured to receive image frames (or simply "images") from camera 12, and process the images to generate output images for display. CPU 16, GPU 18, camera processor 14, or some other circuitry may be configured to process the output image that includes image content generated by camera processor 14 into images for display on display 28. In some examples, GPU 18 may be further configured to render graphics content on display 28.

In some examples, camera processor 14 may be configured as an image processing pipeline. For instance, camera processor 14 may include a camera interface that interfaces between camera 12 and camera processor 14. Camera processor 14 may include additional circuitry to process the image content. Camera processor 14 outputs the resulting images with image content (e.g., pixel values for each of the image pixels) to system memory 30 via memory controller 24.

CPU 16 may comprise a general-purpose or a special-purpose processor that controls operation of camera device 10. A user may provide input to camera device 10 to cause CPU 16 to execute one or more software applications. The software applications that execute on CPU 16 may include, for example, a media player application, a video game application, a graphical user interface application or another program. The user may provide input to camera device 10 via one or more input devices (not shown) such as a keyboard, a mouse, a microphone, a touch pad or another input device that is coupled to camera device 10 via user interface 22.

One example of the software application is a camera application. CPU 16 executes the camera application, and in response, the camera application causes CPU 16 to generate content that display 28 outputs. GPU 18 may be configured to process the content generated by CPU 16 for rendering on display 28. For instance, display 28 may output information such as light intensity, whether flash is enabled, and other such information. The user of camera device 10 may interface with display 28 to configure the manner in which the images are generated (e.g., with or without flash, focus settings, exposure settings, and other parameters).

As one example, after executing the camera application, camera device 10 may be considered to be in preview mode. In preview mode, camera 12 outputs image content to camera processor 14 that performs camera processing and outputs image content to system memory 30 that display interface 26 retrieves and outputs on display 28. In preview mode, the user, via display 28, can view the image content that will be captured when the user engages a button (real or on display) to take a picture. As another example, rather than taking a still image (e.g., picture), the user may record video content (e.g., a series of images). During the recording, the user may be able to view the image content being captured on display 28.

In this disclosure, a preview image may be referred to as an image that is generated in preview mode. For instance, in preview mode, the image that camera 12 outputs and stores (e.g., in local memory 20 or system memory 30) for processing by camera processor 14 or the image that camera processor 14 generates and stores (e.g., in local memory 20 or system memory 30) may be referred to as a preview image. In general, a preview image may be an image generated in preview mode prior to capture and long-term storage of the image.

During preview mode or recording, camera device 10 (e.g., via CPU 16) may control the way in which camera 12 captures images (e.g., before capture or storing of image). This disclosure describes the examples techniques as being performed by CPU 16. However, the example techniques should not be considered limited to CPU 16 performing the example techniques. For instance, CPU 16 in combination with camera processor 14, GPU 18, a DSP, a vector processor, and/or display interface 26 may be configured to perform the example techniques described in this disclosure. For example, one or more processors may be configured to perform the example techniques described in this disclosure. Examples of the one or more processors include camera processor 14, CPU 16, GPU 18, display interface 26, a DSP, a vector processor, or any combination of one or more of camera processor 14, CPU 16, GPU 18, display interface 26, the DSP, or the vector processor.

CPU 16 may be configured to control the exposure and/or focus to capture visually pleasing images. For example, CPU 16 may be configured to generate signals that control the exposure, focus, and white balance, as a few non-limiting examples, of camera 12. CPU 16 may be configured to control the exposure, focus, and white balance based on the preview images received from camera processor 14 during preview mode or recording. In this way, for still images, when the user engages to take the picture, the exposure, focus, and white balance are adjusted (e.g., the parameters for exposure, focus, and possibly white balance are determined before image capture so that the exposure, focus, and white balance can be corrected during the image capture). For recording, the exposure, focus, and white balance may be updated regularly during the recording.

This disclosure describes example techniques for controlling focus level of camera 12, such as examples of user interfaces with which a user may interact to control the focus level of camera 12 (e.g., adjust where the lens for camera 12 is to be located to focus on the desired depth). For focus, CPU 16 may display the preview image on display 28. A user may then select the region where to focus camera 12, and in response, CPU 16 may control the depth of the focus to the depth of the region selected by user (e.g., adjust the lens of camera 12 to the focus on the desired depth).

However, there may be various instances in which controlling the depth of the focus to be the depth of the region selected by the user is undefined. Within the user selected region, there may be image content at different depths, and it may be unclear to which image content camera 12 should focus. As an example, display 28 may be relatively small (e.g., such as being a display of a so-called smart watch). The user may select a region on a preview image displayed on display 28 via a touch. e.g., on a touchscreen. Due to the relatively small size of display 28, the touch from the user may cover a relatively large region of image content of the preview image. Within this relatively large region, there may be image content are different depths, and the depth of focus may be unclear.

In one or more examples described in this disclosure, CPU 16 may be configured to determine whether there is image content at different depths at a region of the preview image. Based on the determination that there is image content at different depths in the region, CPU 16 may output an alternative version of the image content in the region. As one example, CPU 16 may output a zoomed in version of the image content in the region.

For ease of example, CPU 16 is described as outputting a zoomed in version of the image content in the region. However, the example techniques are not so limited. In some examples, CPU 16 may output a blurred version of the image content in the region, where the areas that are in focus are not blurred and areas not in focus are blurred. There may be various other ways in which to output an alternative version of the image content.

CPU 16 may then receive a subsequent user selection within the alternative version, and may adjust a focus level (e.g., depth of focus) of camera 12 based on the subsequent user selection. However, if there is image content at single depth (e.g., if there is not image content at different depths) in the region, CPU 16 may not output an alternative version of the image content in the region. In such examples, CPU 16 may control (e.g., set or adjust) the focus level (e.g., depth of focus) of camera 12 based on the original user selection (e.g., no subsequent user selection is needed).

In other words, a condition may be whether there is image content at different depths in the region. In response to a condition being satisfied (e.g., there is image content at different depths in the region), CPU 16 may output an alternative version of the image content in the region. In response to a condition not being satisfied (e.g., there is not image content at different depths in the region), CPU 16 may not output an alternative version of the image content in the region.

In some examples, the alternative version of the region may encompass the entirety of the area of display 28 that is reserved to display image content. For instance, the zoomed in version (e.g., an example of the alternative version) may be the image content of the region displayed as larger objects. In this case, image content that is outside of the region may not be viewable on display 28. There may be various ways to generate the zoomed in version of the region, such as upsampling, and the example techniques are not limited to any zooming techniques.

There may be various ways in which CPU 16 may determine whether there is image content at different depths in the region. As one example, CPU 16 may determine relative depths of objects in the preview image based on disparity between two images. For instance, sensors within camera 12 (or possibly some other sensors) may capture two images of image content for purposes of determining relative depth. The images captured for determining relative depths need not necessarily be high resolution images, but it may be possible for the pictures to be high resolution. That is, the images captured by the sensors for determining the relative depths may have the same resolution as the preview image, but the example techniques are not so limited.

The relative disparity of image content in the two images may be indicative of the depth of the objects. Utilizing the relative disparity, CPU 16 may generate a depth map that indicates the relative depths of objects in the first image. For instance, the depth map may indicate how far objects are from camera 12, and based on the depths of the objects, CPU 16 may determine whether there is image content within the region at different depths.

As another example, CPU 16 may generate a defocus map, which is another example of a depth map, sometimes also called a PDAF (phase detection auto focus) pixels based depth map or focus map. The defocus map may be similar to the depth map described above; however, the defocus map indicates the location of the objects relative to a current focus depth of camera 12 (i.e., relative to a distance of the current focal point). For instance, the defocus map may indicate whether pixels in the preview image are for objects closer to camera 12 from the current focus depth (e.g., current focal point) or further from the current focus depth. In some examples, the PDAF pixels based depth map may be generated using machine-learning algorithms.

As another example, camera 12 or camera device 10 may include time of flight (ToF) lasers and sensors. CPU 16 may determine the amount of time it takes for light to travel from the ToF lasers to the objects and reflect back to the ToF sensors to determine the depths of the objects, and generate a depth map based on the depths of the objects. Based on the depth map, CPU 16 may determine whether there is image content at different depths within the region.

The above describes some example techniques that CPU 16 may utilize to determine if there is image content at different depths in a region. However, the example techniques of this disclosure should not be considered limited to such examples. As additional techniques CPU 16 may utilize stereo depth or structured light to determine if there is image content at different depths in a region.

After CPU 16 outputs the alternative version of the image content in the region (e.g., after display 28 displays the alternative version of the image content), CPU 16 may receive a subsequent user selection within the alternative version. There may be various examples of the subsequent user selection within the alternative version.

As one example, where the alternative version is a zoomed in version of the image content, the subsequent user selection within the zoomed in version of the image content in the region may be a user selection that selects a sub-region within the region. For instance, the zoomed in version of the image content in the region may be a larger sized version of the image content. Within this larger sized version of the image content displayed on display 28, the user may a touch user selection (e.g., tap) of an area, which would be a sub-region within the region.

As another example, the subsequent user selection within the alternative version of the image content in the region may be a user selection to manually control the focus level. For instance, the user may swipe (e.g., right or left) on display 28, move a slider on display 28, hold down and drag a dial on display 28, as a few examples of manual user selection to control the focus to manually adjust a depth of focus. In some examples, the user may manipulate a physical controller, such as a dial, slider, or rotate a button or "crown" for manual user selection to control the focus manually.

In some examples, CPU 16 may output a histogram, displayed on display 28, illustrating an amount of image content that is closer to or further away from a focal point during the subsequent user selection. For instance, as the user is swiping to manually adjust the focus level, the histogram may indicate how many samples are closer to or further away from the focal point that the user is manually adjusting.

CPU 16 may control a focus level of camera 12 based on the subsequent user selection. For instance, CPU 16 may control a depth of focus for camera 12. As one example, CPU 16 may control the depth of focus for camera 12 based on the sub-region selected as part of the subsequent user selection. As another example, CPU 16 may control the depth of focus for camera 12 based on the manually adjusted focus level.

Camera 12 may then capture an image at the focus level for camera 12 (e.g., at the lens position set by CPU 16). For instance, the user may interact with camera device 10 to cause camera device 10 to capture an image (e.g., image for long-term storage), and camera 12 may capture the image at the focus level.

In some examples, camera 12 may capture one image at the focus level. In some examples, camera 12 may capture multiple images at the focus level, and the user may select one or more images to keep. For instance, system memory 30 may store the multiple images, and the user may view them offline (e.g., at some later time) and determine which images to keep and/or which images to perform post-processing (e.g., manipulate).

Memory controller 24 facilitates the transfer of data going into and out of system memory 30. For example, memory controller 24 may receive memory read and write commands, and service such commands with respect to memory 30 in order to provide memory services for the components in camera device 10. Memory controller 24 is communicatively coupled to system memory 30. Although memory controller 24 is illustrated in the example of camera device 10 of FIG. 1 as being a processing circuit that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by camera processor 14, CPU 16, and GPU 18. For example, system memory 30 may store user applications (e.g., instructions for the camera application), resulting frames from camera processor 14, etc. System memory 30 may additionally store information for use by and/or generated by other components of camera device 10. For example, system memory 30 may act as a device memory for camera processor 14.

Figure 2:
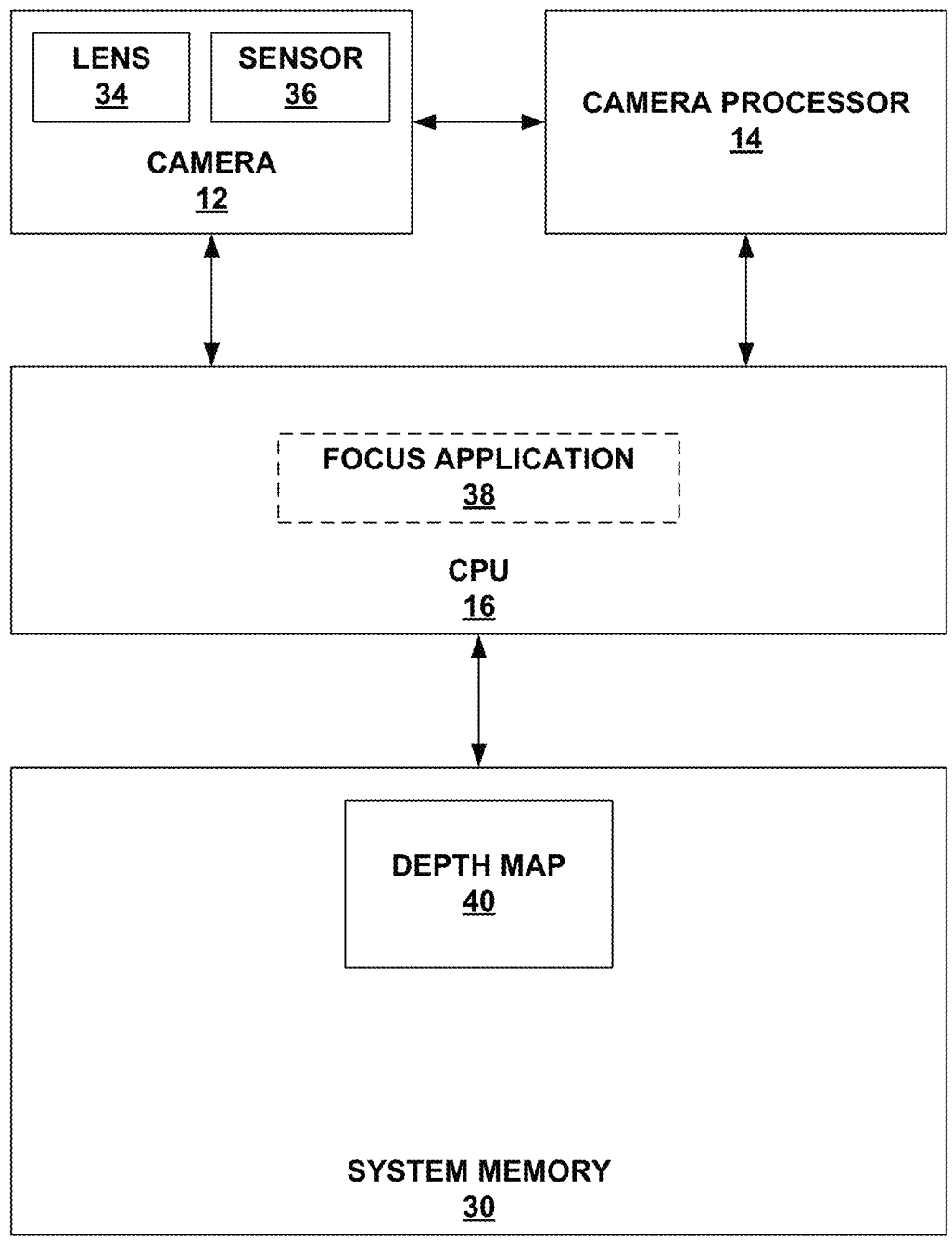
FIG. 2 is a block diagram illustrating the central processing unit (CPU) and system memory of the device of FIG. 1 in further detail.

FIG. 2 is a block diagram illustrating the central processing unit (CPU) and system memory of the device of FIG. 1 in further detail. As illustrated in FIG. 2, camera 12 includes lens 34 and sensor 36. CPU 16 may be configured to execute focus application 38.

In one or more examples, CPU 16 may be configured to generate depth map 40 that indicates depths of samples in a preview image. CPU 16 may store the depth map 40 in system memory 30. CPU 16 may generate depth map 40 utilizing various techniques such as based on disparity of pixels in images having same image content, based on relative distance to a focal point, or based on ToF sensors, as a few non-limiting examples.

In one or more examples, system memory 30 may store the object code for focus application 38 that CPU 16 retrieves and executes. In one or more examples, rather than being software applications executing on CPU 16, CPU 16 may include specialized hardware to perform the operations of controlling the focus level for camera 12.

In one or more examples, light enters through lens 34 and is received by sensor 36. Focus application 38 may modify the location of lens 34 within camera 12 so as to adjust the focus of lens 34 (e.g., control the focus level by adjusting the position of lens 34). For instance, by modifying the location of lens 34, focus application 38 may control the focal point to sensor 36, and therefore control which portions of the image content will be in focus. In some examples, it may be possible to move the position of lens 34 to control the focal point. In this way, focus application may control a focus level (e.g., position of lens 34) for camera 12 based on the subsequent user selection.

To capture an image, the user may interact with camera device 10. As described above, prior to capturing an image, display 28 may display a preview image (e.g., a preview of the image that is to be captured) for image capture and/or video capture. In accordance with examples described in this disclosure, the user may determine where to set the focus of camera 12 (e.g., where the position of lens 12 should be). System memory 30 may store the preview image.

For instance, focus application 38 may receive a user selection to focus at a region of the preview image stored in system memory 30. One example of the user selection may be a touch (e.g., tap) by the user on display 28 where the user wants to focus camera 12 (e.g., what the focus level of camera 12 should be). In this example, CPU 16 may determine the coordinates of where the user touched display 28, and determine that the region encompassed by where the user touched display 28 is the user selected region. The user selection technique being a "touch" or a "tap" is one example, and should not be considered limiting. The user may manually enter coordinates, select a region from a menu, etc.

In accordance with one or more examples described in this disclosure, focus application 38 may determine whether there is image content at different depths in the region. For example, focus application 38 may access depth map 40. Focus application 38 may determine a region within depth map 40 that corresponds to the user selected region of the preview image. Based on the depth of the samples in the region, as indicated by depth map 40, focus application 38 may determine whether there is image content at different depths in the region.

Based on the determination that there is image content at different depths in the region, focus application 38 may output an alternative version of the image content in the region. In some examples, rather than or in addition to focus application 38 outputting an alternative version of the image content, GPU 18 may be configured to output the alternative version of the image content. As another example, CPU 16 may execute a zoom application or function, and focus application 38 may call the zoom application, and the zoom application may output a zoomed in version (e.g., an example of the alternative version) of the image content in the region. Other ways in which to output the alternative version of the image content in the region are possible. Display 28 may be configured to display the alternative version of the image content in the region.

Whether there is image content at different depths in the region may be considered as a condition. For instance, in response to the condition being satisfied that there is image content at different depths in the region, CPU 16 and/or GPU 18 may output the alternative version of the image content in the region. In some examples, CPU 16 and/or GPU 18 may output the alternative version of the image content in the region only if there is image content at different depths in the region. For instance, only if the condition is satisfied that there is image content at different depth in the region, do CPU 16 and/or GPU 18 output the alternative version of the image content in the region. As an example, if the condition is not satisfied (i.e., there is not image content at different depths in the region), CPU 16 and/or GPU 18 may not output the alternative version of the image content in the region.

Focus application 38 may receive a subsequent user selection within the alternative version. There may be various examples of the subsequent user selection within the alternative version. As one example, focus application 38 may receive the subsequent user selection within the alternative version of the image content in the region that selects a sub-region within the region. For instance, the subsequent user selection within the alternative version of the image content in the region that selects the sub-region within the region may be a touch user selection that selects the sub-region within the region. As another example, focus application 38 may receive the subsequent user selection within the alternative version of the image content to control the focus manually. For instance, the subsequent user selection within the alternative version of the image content to control the focus manually may be a swipe user selection, moving a slider, holding down and dragging a dial, as a few examples. Examples of the selection of a sub-region and controlling of focus manually are described with respect to FIGS. 5 and 6. In some examples, the user may manipulate a physical controller, such as a dial, slider, or rotate a button or "crown" for manual user selection to control the focus manually.

Focus application 38 may control a focus level for camera 12 based on the subsequent user selection. For example, focus application 38 may set the depth of focus (e.g., set the focal point) for camera 12. As an example, focus application 38 may control the position of lens 34 and/or sensor 36 to control the depth of focus. Camera device 10 may be configured to capture an image at the focus of camera 12. For example, after setting the focus, the user may interact with camera device 10 to capture an image (e.g., still image or for video) with the focus of camera 12 at the focus level.

Figure 3:
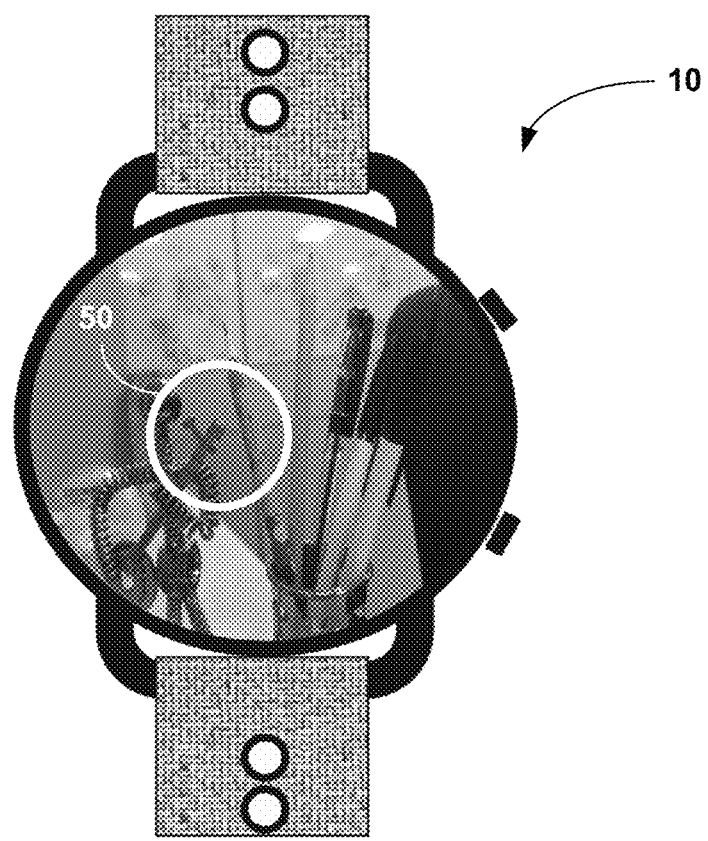
FIG. 3 is a conceptual diagram illustrating an example of a device displaying image content and a user selection of a region.

FIG. 3 is a conceptual diagram illustrating an example of a device displaying image content and a user selection of a region. For instance, FIG. 3 illustrates camera device 10 as a watch, and display 28 is the face of the watch. In some examples, the sensor may be on the face of the watch. In this example, to control the focus level, the user may touch region 50.

Figure 4A:
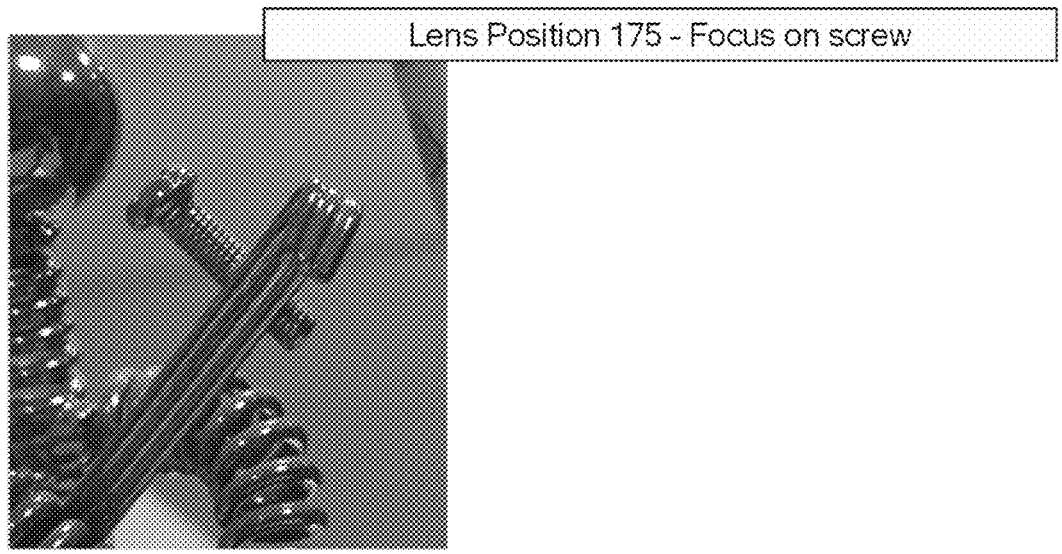
FIGS. 4A and 4B are conceptual diagrams illustrating focus set at different depths.
Figure 4B:
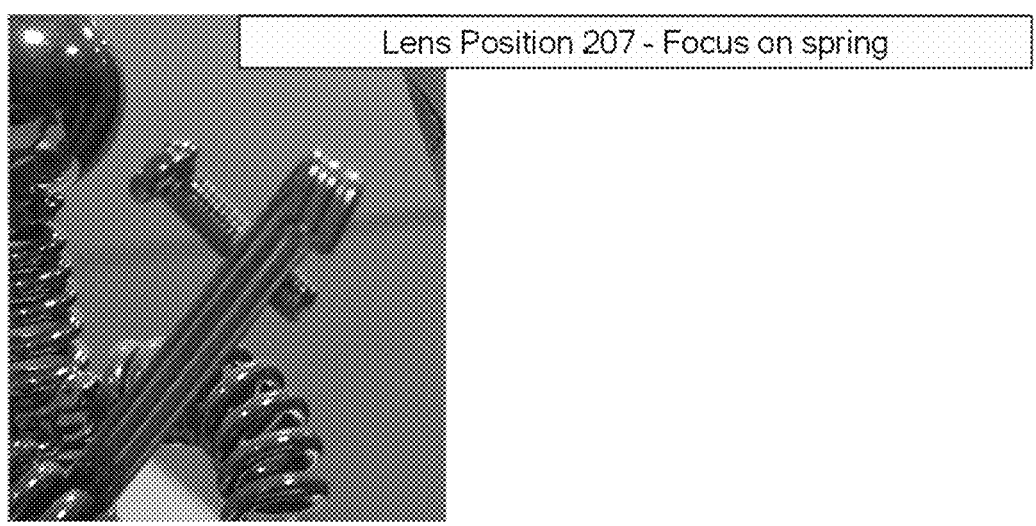

FIGS. 4A and 4B are conceptual diagrams illustrating focus levels set at different depths. FIGS. 4A and 4B illustrate zoomed in versions of region 50 of FIG. 3. However, in FIGS. 4A and 4B the depth of focus is different (e.g., focal point is different). For example, in FIG. 4A, the position of lens 34 is at position 175, which causes the depth of focus to be at the depth of the screw shown in the image. In FIG. 4B, the position of lens 34 is at position 207, which causes the depth of focus to be at the depth of the spring shown in the image.

As illustrated with FIGS. 4A and 4B, relying only on the touch by the user at region 50 (FIG. 3) to define the depth of focus may not be sufficient to determine the focus level for camera 12. For instance, with just the selection of region 50, it may be unclear whether camera 12 is to focus on screw, and lens 34 should have lens position of 175, or whether camera 12 is to focus on the spring, and lens 34 should have lens position of 207.

Accordingly, in one or more examples, one or more processors (e.g., CPU 16) may be configured to determine whether there is image content at different depths at region 50. If there is image content at different depths at region 50, then CPU 16 may cause display 28 to display an alternative version (e.g., zoomed in version) of the image content. For instance, the alternative version of the image content may be such that it is easier for the user to properly identify where to focus camera 12. If, however, there is image content at single depth (e.g., there is not image content at different depths) at region 50, then CPU 16 may not cause display 28 to display an alternative version.

Figure 5:
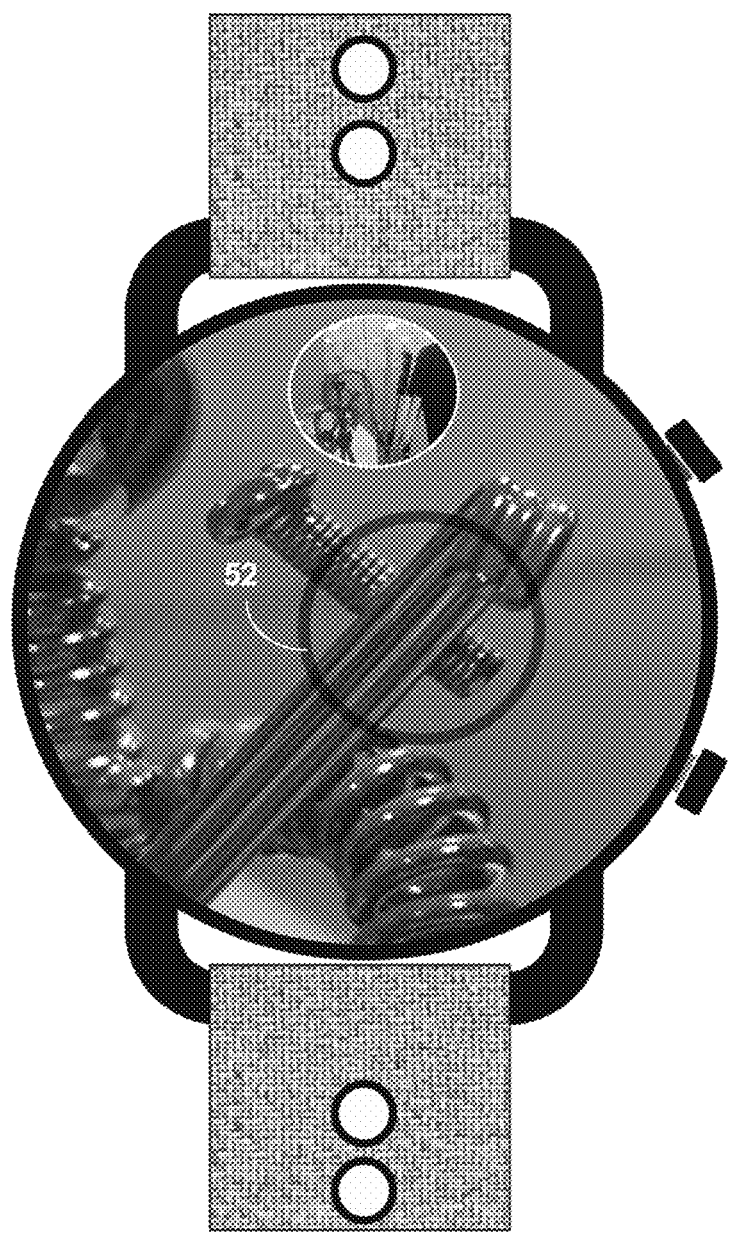
FIG. 5 is a conceptual diagram illustrating an example of a user interface for touch focus assist mode.

FIG. 5 is a conceptual diagram illustrating an example of a user interface for touch focus assist mode. FIG. 5 illustrates a zoomed in version of region 50 of FIG. 3. The zoomed in version of region 50 is one example of an alternative version of region 50. For touch focus assist mode, the user select sub-region 52 within the region 50. As one example, a subsequent user selection within the alternative version (e.g., zoomed in version) of the image content in region 50 that selects sub-region 52 within region 50 may be a touch user selection that selects sub-region 52 within region 50. As illustrated in FIG. 5, because the image content of region 50 is larger in the zoomed in version of region 50, the user can better specify that the focus should be for sub-region 52.

Figure 6:
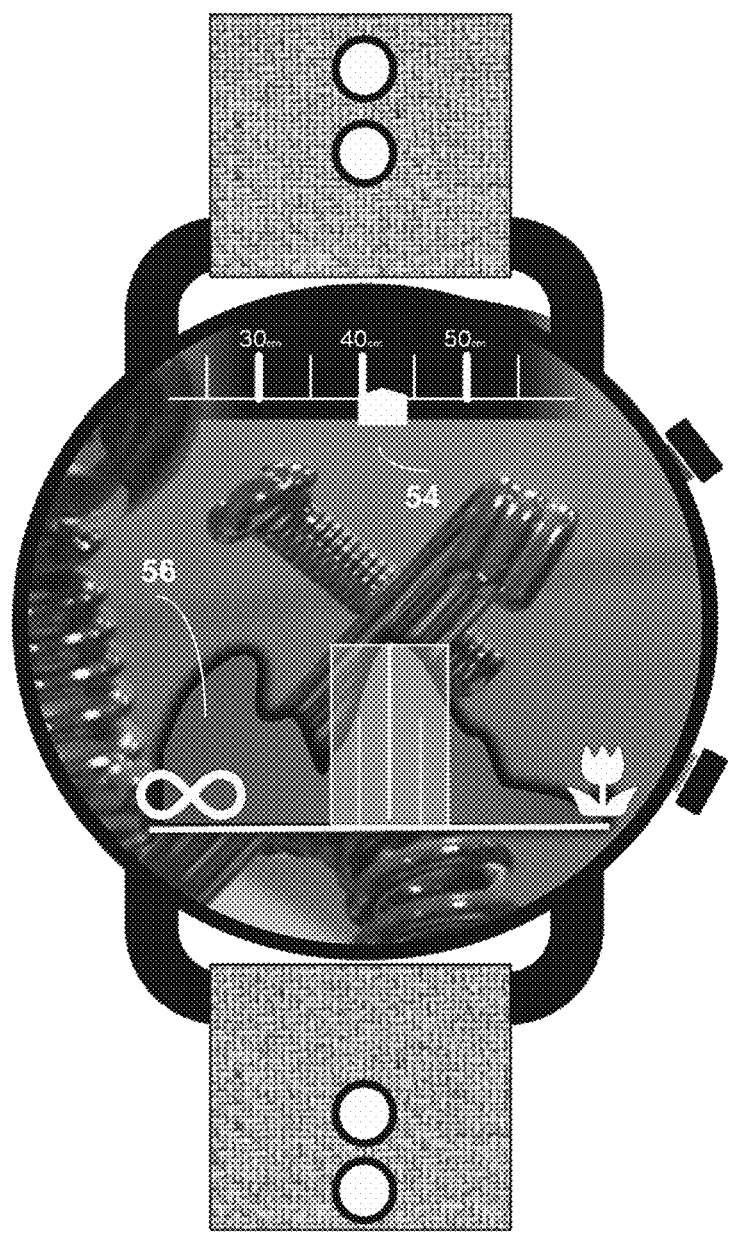
FIG. 6 is a conceptual diagram illustrating an example of a user interface for manual focus assist mode.

FIG. 6 is a conceptual diagram illustrating an example of a user interface for manual focus assist mode. Like FIG. 5, FIG. 6 illustrates a zoomed in version of region 50 of FIG. 3, which is an example of an alternative version of region 50. For manual focus assist mode, display 28 may display indication 54 that shows the position of lens 34 and/or sensor 36. The user may be able to see where the focus of camera 12 is based on which objects appear sharp and which objects look burry on display 28. That is, CPU 16 may be configured to apply an exaggerated blur effect on regions that are not in focus and simulate a shallow depth of field effect for the purpose of highlighting which regions are focused accurately.

The user may swipe left and right, move a slider, hold and drag on the display, as one non-limiting example, to move the position of lens 34 and/or sensor 36 to change the depth of focus (e.g., focal point). As the user changes the position of lens 34 and/or sensor 36, different objects on display 28 will become blurry, and previously blurry objects may come into focus and appear sharp. CPU 16 may control the focus of the camera based on where the user stopped swiping (e.g., where the user manually controls the focus).

In some examples, CPU 16 may be configured to output histogram 56 illustrating an amount of image content that is closer to and further away from a focal point during the user selection. For instance, as the user is providing a user selection (e.g., a swipe user selection, a move on slider user selection, hold and drag), the shape of histogram 56 may change to show how many samples are closer to (e.g., on the left of histogram 56) and how many samples are further away (e.g., on right of histogram 56) from a focal point. CPU 16 need not necessarily output histogram 56 in all examples.

In the example of FIG. 6, there is one histogram 56. However, the example techniques are not so limited. In some examples, there may be two or more histograms. For instance, a first histogram may display relative depths of pixels for the full field of view (i.e., all the pixels that will be captured). A second histogram may display the relative depths of pixels that are currently in view (e.g., in the event that zoom in used to zoom into a portion for selecting depth). The first and second histograms may be displayed overlaid, or may be displayed separately.

Figure 7A:
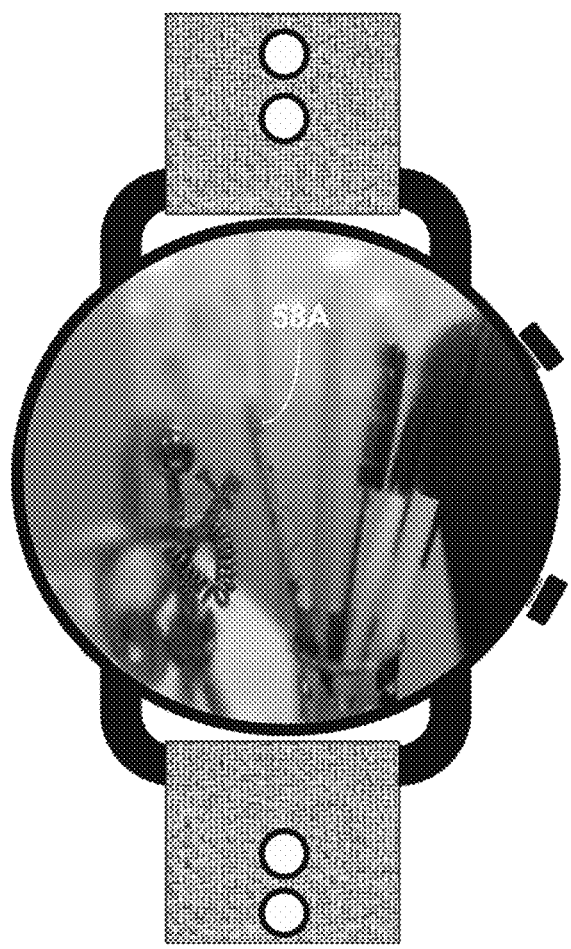
FIGS. 7A and 7B are conceptual diagrams illustrating an example of a user interface with blurring.
Figure 7B:
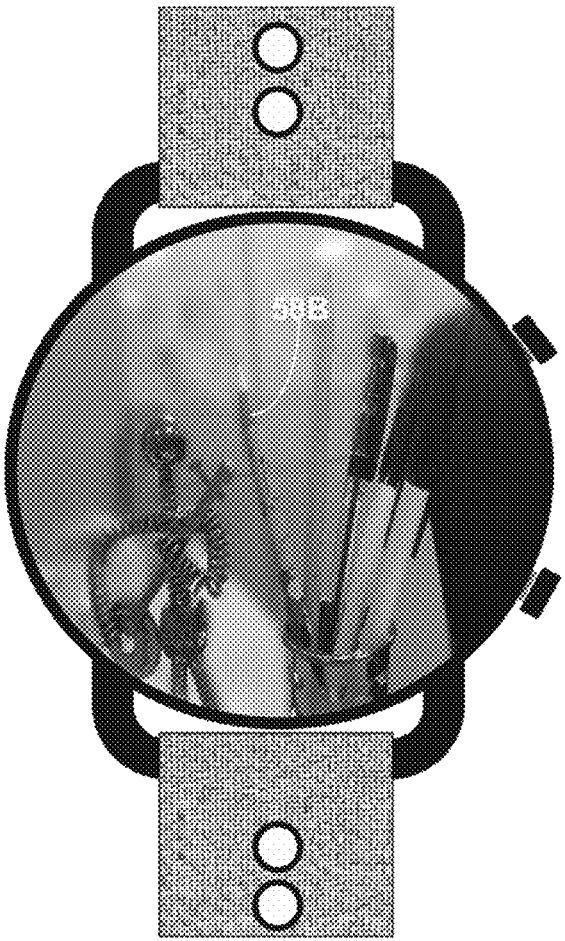

FIGS. 7A and 7B are conceptual diagrams illustrating an example of a user interface with blurring. In the above examples, one example of the alternative version of the image content is a zoomed in version of the image content. However, in some examples, rather than or in addition to outputting a zoomed in version of the image content, CPU 16 may output a blurred image, which is another example of the alternative version of the image content.

For instance, as illustrated in FIGS. 7A and 7B, after a user selection to focus at a region of the preview image, and after determination that there is image content at different depths in the region, CPU 16 may output a blurred version of the image content in the region. In the blurred version, areas that are currently not in focus may be rendered (e.g., by GPU 18) with relatively heavy blurring. The blurred version may also be considered as simulating extremely shallow depth of field. This way, it is clear what areas are in focus and what areas are not in focus.

As an example, in FIG. 7A and 7B the position of lens 34 and/or sensor 36 may be different. In FIG. 7A, pencil 58A appears heavily blurred to indicate that the focus level of camera 12 is not at the depth of pencil 58A. However, in FIG. 7B, pencil 58B appears in focus and not blurred to indicate that the focus of camera 12 is at the depth of pencil 58B. The user may manually adjust the focus of camera 12, and in the examples of FIGS. 7A and 7B, the blurriness may indicate to the user the focal point of camera 12. When the focal point of camera 12 (e.g., depth of the focus of camera 12) is at the desired location, the user may stop changing the position of lens 34 and/or sensor 36, and CPU 16 may control the focus level of camera 12 based on the position of lens 34 and/or sensor 36.

Figure 8:
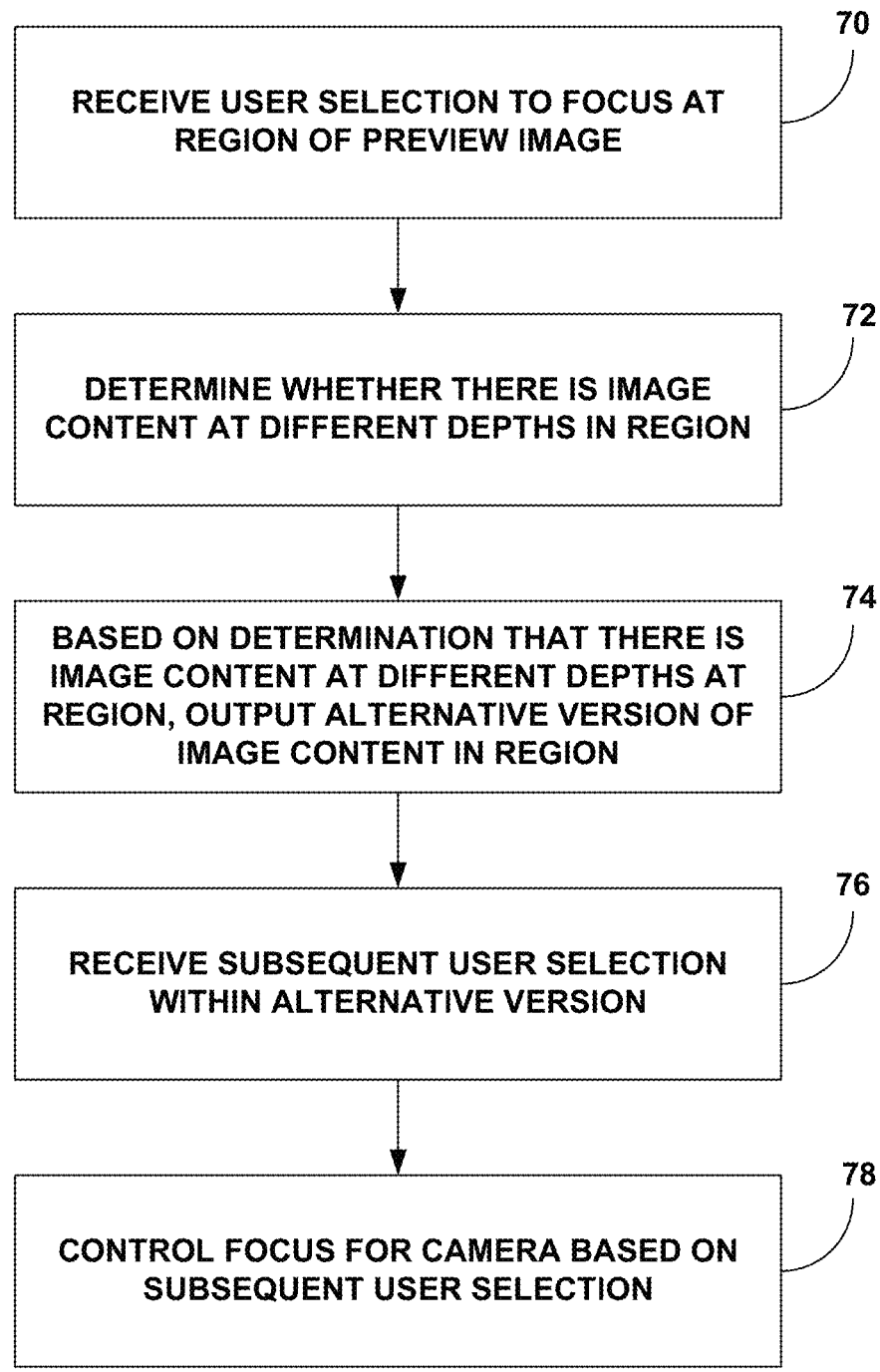
FIG. 8 is a flowchart illustrating one or more example techniques of operation.
Figure 9:
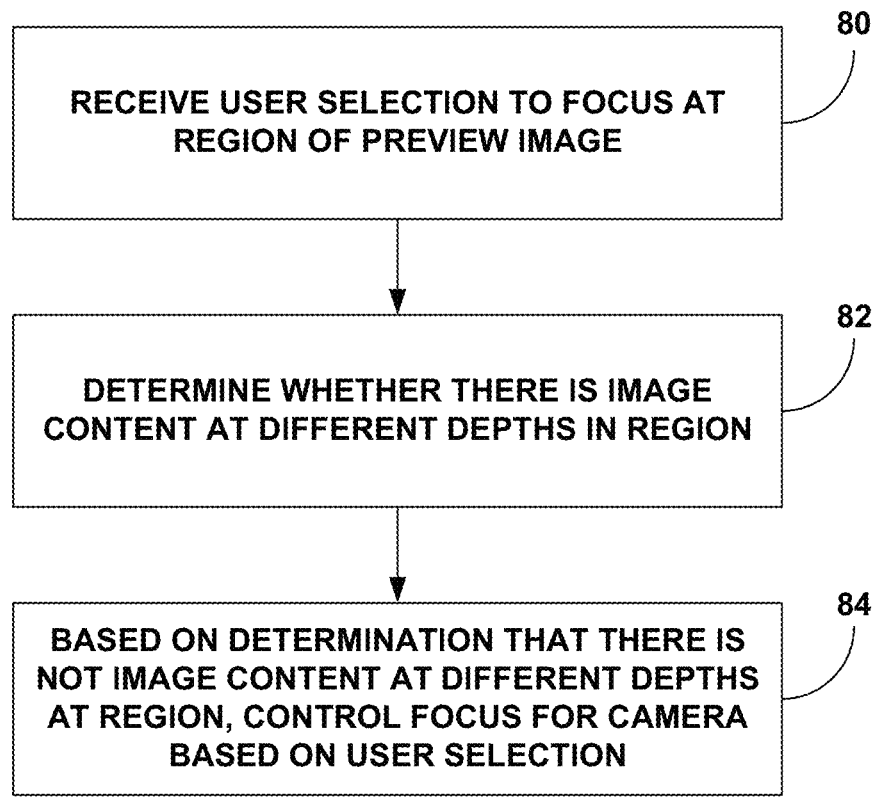
FIG. 9 is a flowchart illustrating one or more example techniques of operation.
Figure 10:
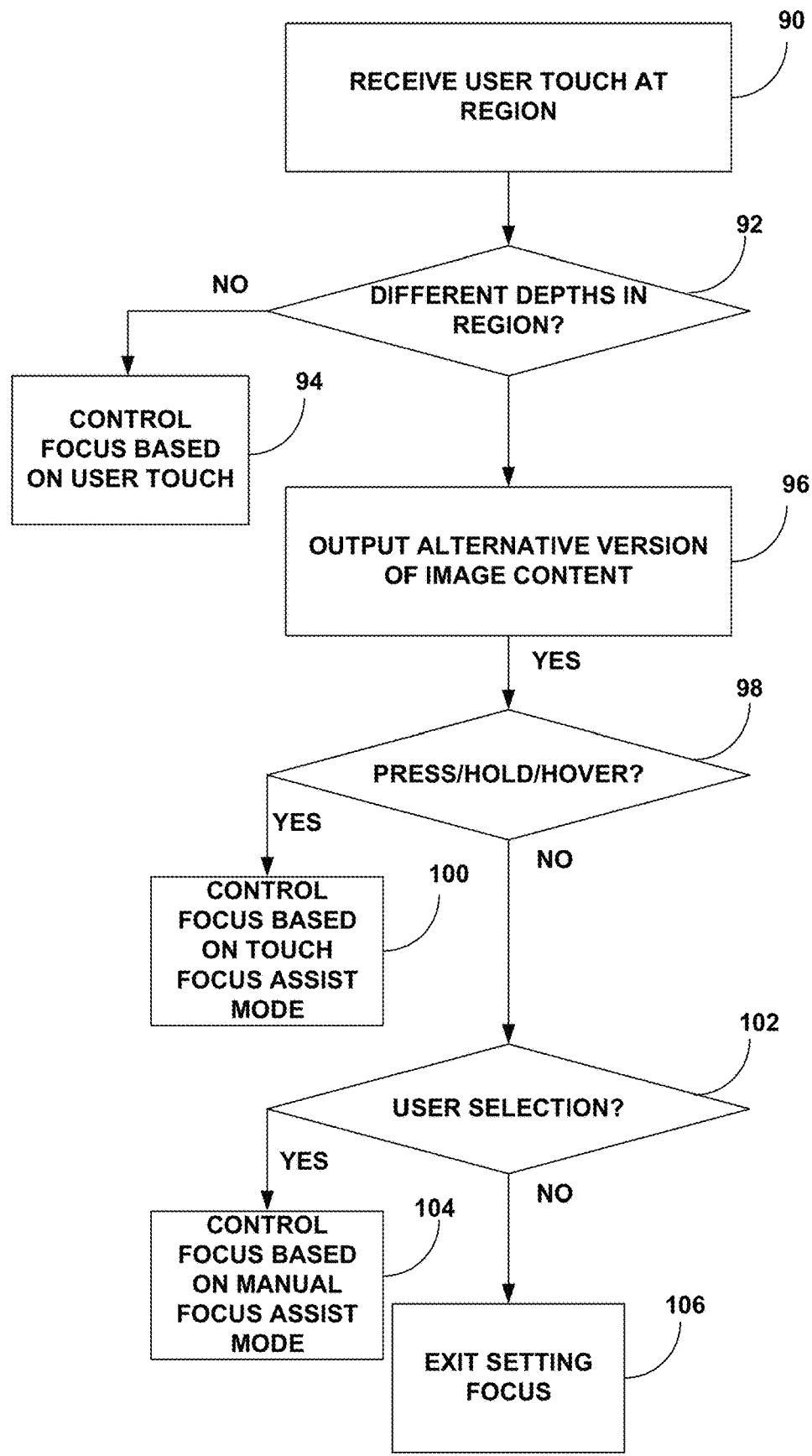
FIG. 10 is a flowchart illustrating one or more example techniques of operation.

FIG. 8 is a flowchart illustrating one or more example techniques of operation. For ease of description, FIGS. 8-10 are described with respect to one or more processors that are configured to perform the example techniques. Examples of the one or more processors include any one or combination of CPU 16, GPU 18, display interface 26, or any other processing component of camera device 10.

In the example of FIG. 8, the one or more processors may receive user selection to focus at a region (e.g., region 50 of FIG. 3) of a preview image stored in memory (e.g., system memory 30) (70). As one example, the user may touch or tap on display 28, and the area encompassed by the touch may correspond to the region on which camera 12 is to focus. However, other techniques are possible such as by inputting information of the region based on coordinates, selecting from a menu, etc. In general, the one or more processors receiving the user selection may refer to the one or more processors receiving a signal generated by display 28 or some other unit that indicates the region that the user selected.

The one or more processors may determine whether there is image content at different depths in the region (72). As one example, the one or more processors may access depth map 40 from system memory 30, and determine whether there is image content at different depths in the region based on depth map 40. For instance, as described above, depth map 40 may indicate relative depths of samples in the preview image. If depth map 40 indicates that there are samples having different depths in the image content in the region, the one or more processors may determine that there is image content at different depths. If depth map 40 indicates that there are not samples having different depths in the image content in the region, the one or more processors may determine that there is not image content at different depths (e.g., there is image content at single depth).

Based on the determination that there is image content at different depths in the region, the one or more processors may output an alternative version of the image content in the region (74). As an example, in response to a condition being satisfied that there is image content at different depths in the region, the one or more processors may output the alternative version of the image content in the region. In some cases, the one or more processors may output the alternative version of the image content in the region only when there is image content at different depths in the region.

As one example, to output the alternative version of the image content in the region, the one or more processors may output a zoomed in version of the image content in the region. As another example, to output the alternative version of the image content in the region, the one or more processors may blur portions of the region that are not in focus.

The one or more processors may receive a subsequent user selection within the alternative version (76). Similar to above, the one or more processors receiving the subsequent user selection may refer to a signal generated by display 28 or some other unit that indicates the subsequent user selection. The one or more processors may control a focus level for camera 12 based on the subsequent user selection (78). For instance, the one or more processors may set a depth of focus for camera 12. Camera device 10 may be configured to capture an image at the focus level of camera 12.

As one example, to receive the subsequent user selection, the one or more processors may receive the subsequent user selection within the alternative version of the image content in the region that selects a sub-region within the region. In such examples, to control the focus level, the one or more processors may control the focus level based on the subsequent user selection of the sub-region. For instance, the subsequent user selection within the alternative version of the image content in the region that selects the sub-region within the region may be a touch user selection that selects the sub-region within the region.

As another example, to receive the subsequent user selection, the one or more processors may receive the subsequent user selection within the alternative version of the image content to manually control the focus level. In such examples, to control the focus level, the one or more processors may control the focus level based on manual controlling of the focus level by the user. For example, the subsequent user selection within the alternative version of the image content to manually control the focus level may be a user selection to manually adjust a depth of focus. In some examples, the one or more processors may be configured to output a histogram (e.g., histogram 56) illustrating an amount of image content that is closer to and further away from a focal point during the subsequent user selection.

FIG. 9 is a flowchart illustrating one or more example techniques of operation. FIG. 9 illustrates an example where there is image content at single depth (e.g., there is not image content at different depths). For instance, assume that in FIG. 8, the user selection is a first user selection, the region is a first region, the focus level is a first focus level, and the preview image is a first preview image.

In some examples, the one or more processors may receive a second user selection to focus at a second region of a second preview image (80). In this example, the one or more processors may determine whether there is image content at different depths at the second region (82). For instance, the one or more processors may perform similar techniques are those described in FIG. 8 to determine whether there is image content at different depths at the second region.

Based on the determination that there is not image content at different depths at the second region, the one or more processors may control a second focus level for camera 12 based on the second user selection (84). For instance, because there is not image content at different depths, there may not be any confusion as to where to focus camera 12. Therefore, rather than displaying an alternative version of the image content, the one or more processors may be able to control the focus level of camera 12 based on the user selection (e.g., no subsequent user selection is needed).

FIG. 10 is a flowchart illustrating one or more example techniques of operation. In the example of FIG. 10, display 28 may receive a user touch at a region (90). Display 28 may transmit a signal to one or more processors that identifies the area encompassed by the region.

The one or more processors may determine whether there is image content at different depths in the region (92). If the one or more processors determine that there is not image content at different depths (NO of 92), the one or more processors may control the focus level of camera 12 based on the region that the user touched (94).

If the one or more processors determine that there is image content at different depths (YES of 92), the one or more processors may output an alternative version of the image content in the region (96). Examples of the alternative version include the zoomed in version and the blurred version, but other examples are possible.

The one or more processors may determine whether the user is pressing, holding, or hovering over display 28 (98). For instance, display 28 may generate a signal that the one or more processors receive that indicates whether the user is pressing, holding, or hovering over display 28.

If the one or more processors determine that the user is pressing, holding, or hovering over display 28 (YES of 98), the one or more processors may control the focus level for camera 12 based on the touch focus assist mode. One example of the touch focus assist mode is described above with respect to FIG. 5.

If the one or more processors determine that the user is not pressing, holding, or hovering over display 28 (NO of 98), the one or more processors may determine whether the user is swiping left or right on display 28 (102). If the one or more processors determine that the user is swiping left or right on display 28 (YES of 102), the one or more processors may control the focus level for camera 12 based on the manual focus assist mode (104). Examples of the manual focus assist mode include the examples illustrated in FIGS. 6 and 7A and 7B.

If the one or more processors determine that the user is not swiping left or right on display 28, the one or more processors may exit controlling the focuslevel level (106). For instance, the operation of controlling the focus may timeout if the user does not provide an input for how to control the focus level.

In the example of FIG. 10, the example operations do not necessarily have to be performed in the illustrated order. For instance, in some examples, the one or more processors may first determine if there is a user selection (e.g., swipe, move slider, hold and drag dial, etc.) on display 28 to manually control the focus level (102) and control the focus level based on whether there is a user selection. In such example, if there is not a user selection on display 28 to manually control the focus level, then the one or more processors may determine if there is a press, hold, or hover over display 28 (98) for selection of a sub-region for controlling the focus level. In some examples, the user may manipulate a physical controller, such as a dial, slider, or rotate a button or "crown" for manual user selection to control the focus manually.

The following describes one or more example techniques in accordance with this disclosure.

Example 1. A device for image capture, the device comprising: a memory configured to store a preview image; and one or more processors coupled to the memory and configured to: receive a user selection to focus at a region of the preview image stored in the memory; determine whether there is image content at different depths in the region; based on the determination that there is image content at different depths in the region, output an alternative version of the image content in the region; receive a subsequent user selection within the alternative version; and control a focus level for a camera based on the subsequent user selection.

Example 2. The device of example 1, wherein outputting the alternative version of the image content in the region comprises outputting a zoomed in version of the image content in the region.

Example 3. The device of any of examples 1 and 2, wherein controlling the focus level for the camera comprises controlling a lens position of a lens of the camera.

Example 4. The device of any of examples 1-4, wherein receiving the subsequent user selection comprises receiving the subsequent user selection within the alternative version of the image content in the region that selects a sub-region within the region, and wherein controlling the focus level comprises controlling the focus level based on the subsequent user selection of the sub-region.

Example 5. The device of example 4, wherein the subsequent user selection within the alternative version of the image content in the region that selects the sub-region within the region comprises a touch user selection that selects the sub-region within the region.

Example 6. The device of any of examples 1-5, wherein receiving the subsequent user selection comprises receiving the subsequent user selection within the alternative version of the image content to manually control the focus level, and wherein controlling the focus comprises controlling the focus based on the manual controlling of the focus level by a user.

Example 7. The device of example 6, wherein the one or more processors are configured to output a histogram illustrating an amount of the image content that is closer to and an another amount of the image content that is further away from a focal point during the subsequent user selection.

Example 8. The device of examples 6 and 7, wherein the subsequent user selection within the alternative version of the image content to manually control the focus level comprises a swipe, slide, or drag and hold user selection to manually adjust a depth of focus.

Example 9. The device of examples 1-8, wherein the user selection is a first user selection, wherein the region is a first region, wherein the focus level is a first focus level, wherein the preview image is a first preview image, and wherein the one or more processors are configured to: receive a second user selection to focus at a second region of a second preview image; determine whether there is image content at different depths at the second region; and based on the determination that there is not image content at different depths at the second region, control a second focus level for the camera based on the second user selection.

Example 10. The device of any of examples 1-9, wherein, based on the determination that there is image content at different depths in the region, outputting the alternative version of the image content in the region comprises outputting, in response to a condition being satisfied that there is image content at different depths in the region, the alternative version of the image content in the region.

Example 11. The device of any of examples 1-10, wherein outputting an alternative version of the image content in the region comprises blurring portions of the region that are not in focus.

Example 12. The device of any of examples 1-11, wherein the device is configured to capture an image at the focus level of the camera.

Example 13. The device of any of examples 1-12, wherein determining whether there is image content at different depths in the region comprises determining whether there is image content at different depths based on one or more of a phase detection auto focus (PDAF) based depth map, a defocus map, time of flight (ToF) stereo depth, or structured light.

Example 14. A method for image capture, the method comprising: receiving a user selection to focus at a region of the preview image stored in the memory; determining that there is image content at different depths in the region; based on the determination that there is image content at different depths in the region, outputting an alternative version of the image content in the region; receiving a subsequent user selection within the alternative version; and controlling a focus level for a camera based on the subsequent user selection.

Example 15. The method of example 14, wherein outputting the alternative version of the image content comprises outputting a zoomed in version of the image content.

Example 16. The method of any of examples 14 and 15, wherein controlling the focus level for the camera comprises controlling a lens position of a lens of the camera.

Example 17. The method of any of examples 14-16, wherein receiving the subsequent user selection comprises receiving the subsequent user selection within the alternative version of the image content in the region that selects a sub-region within the region, and wherein controlling the focus level comprises controlling the focus level based on the subsequent user selection of the sub-region.

Example 18. The method of example 17, wherein the subsequent user selection within the alternative version of the image content in the region that selects the sub-region within the region comprises a touch user selection that selects the sub-region within the region.

Example 19. The method of any of examples 14-18, wherein receiving the subsequent user selection comprises receiving the subsequent user selection within the alternative version of the image content to manually control the focus level, and wherein controlling the focus comprises controlling the focus based on the manual controlling of the focus level by a user.

Example 20. The method of example 19, further comprising outputting a histogram illustrating an amount of the image content that is closer to and an another amount of the image content that is further away from a focal point during the subsequent user selection.

Example 21. The method of any of examples 19 and 20, wherein the subsequent user selection within the alternative version of the image content to manually control the focus level comprises a swipe, slide, or drag and hold user selection to manually adjust a depth of focus.

Example 22. The method of any of examples 14-21, wherein the user selection is a first user selection, wherein the region is a first region, and wherein the focus level is a first focus level, wherein the preview image is a first preview image, the method further comprising: receiving a second user selection to focus at a second region of a second preview image; determining that there is image content at different depths at the second region; based on the determination that there is not image content at different depths at the second region, controlling a second focus level for the camera based on the second user selection.

Example 23. The method of any of examples 14-22, wherein, based on the determination that there is image content at different depths in the region, outputting the alternative version of the image content in the region comprises outputting, in response to a condition being satisfied that there is image content at different depths in the region, the alternative version of the image content in the region.

Example 24. The method of any of examples 14-23, outputting an alternative version of the image content in the region comprises blurring portions of the region that are not in focus.

Example 25. The method of any of examples 14-24, further comprising capturing an image at the focus level of the camera.

Example 26. The method of any of examples 14-25, determining that there is image content at different depths in the region comprises determining whether there is image content at different depths based on one or more of a phase detection auto focus (PDAF) based depth map, a defocus map, time of flight (ToF), stereo depth, or structured light.

Example 27. A computer-readable storage medium storing instructions thereon that when executed cause one or more processors to: receive a user selection to focus at a region of the preview image stored in the memory; determine that there is image content at different depths in the region; based on the determination that there is image content at different depths in the region, output an alternative version of the image content in the region; receive a subsequent user selection within the alternative version; and control a focus level for a camera based on the subsequent user selection.

Example 28. The computer-readable storage medium of example 27, wherein the instructions that cause the one or more processors to control the focus level for the camera comprise instructions that cause the one or more processors to control a lens position of a lens of the camera.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for image capture, the device comprising:
   a memory configured to store a first preview image and a second preview image; and
   one or more processors coupled to the memory and configured to:
   receive a first user selection to focus at a first region of the first preview image stored in the memory;
   determine whether there is image content at different depths in the first region;
   based on the determination that there is image content at different depths in the first region, output an alternative version of the image content in the first region;
   receive a subsequent user selection within the alternative version of the image content in the first region;
   control a first focus level for a camera based on the subsequent user selection;
   receive a second user selection to focus at a second region of the second preview image;
   determine whether there is image content at different depths at the second region; and
   based on the determination that there is no image content at different depths at the second region, control a second focus level for the camera based on the second user selection.

2. The device of claim 1, wherein outputting the alternative version of the image content in the first region comprises outputting a zoomed in version of the image content in the first region.

3. The device of claim 1, wherein controlling the first focus level for the camera comprises controlling a depth of focus for the camera.

4. The device of claim 1,
   wherein receiving the subsequent user selection comprises receiving the subsequent user selection within the alternative version of the image content in the first region that selects a sub-region within the first region, and
   wherein controlling the first focus level comprises controlling the first focus level based on the subsequent user selection of the sub-region.

5. The device of claim 4, wherein the subsequent user selection within the alternative version of the image content in the first region that selects the sub-region within the first region comprises a touch user selection that selects the sub-region within the first region.

6. The device of claim 1,
   wherein receiving the subsequent user selection comprises receiving the subsequent user selection within the alternative version of the image content in the first region to manually control the first focus level, and
   wherein controlling the first focus level comprises controlling the first focus level based on the manual controlling of the first focus level by a user.

7. The device of claim 6, wherein the one or more processors are configured to output a histogram illustrating an amount of the image content that is closer to and an another amount of the image content that is further away from a focal point during the subsequent user selection.

8. The device of claim 6, wherein the subsequent user selection within the alternative version of the image content to manually control the first focus level comprises a swipe, slide, or drag and hold user selection to manually adjust a depth of focus.

9. The device of claim 1, wherein, based on the determination that there is image content at different depths in the first region, outputting the alternative version of the image content in the first region comprises outputting, in response to a condition being satisfied that there is image content at different depths in the first region, the alternative version of the image content in the first region.

10. The device of claim 1, wherein outputting the alternative version of the image content in the first region comprises blurring portions of the first region that are not in focus.

11. The device of claim 1, wherein the device is configured to capture an image at the first focus level of the camera.

12. The device of claim 1, wherein determining whether there is image content at different depths in the first region comprises determining whether there is image content at different depths based on one or more of a phase detection auto focus (PDAF) based depth map, a defocus map, or time of flight (ToF).

13. A method for image capture, the method comprising:
    receiving a first user selection to focus at a first region of a first preview image stored in a memory;
    determining that there is image content at different depths in the first region;
    based on the determination that there is image content at different depths in the first region, outputting an alternative version of the image content in the first region;
    receiving a subsequent user selection within the alternative version of the image content in the first region;
    controlling a first focus level for a camera based on the subsequent user selection;
    receiving a second user selection to focus at a second region of a second preview image stored in the memory; and
    determining that there is no image content at different depths at the second region;
    based on the determination that there is no image content at different depths at the second region, controlling a second focus level for the camera based on the second user selection.

14. The method of claim 13, wherein outputting the alternative version of the image content in the first region comprises outputting a zoomed in version of the image content in the first region.

15. The method of claim 13, wherein controlling the first focus level for the camera comprises controlling a depth of focus for the camera.

16. The method of claim 13,
wherein receiving the subsequent user selection comprises receiving the subsequent user selection within the alternative version of the image content in the first region that selects a sub-region within the first region, and
wherein controlling the first focus level comprises controlling the first focus level based on the subsequent user selection of the sub-region.

17. The method of claim 16, wherein the subsequent user selection within the alternative version of the image content in the first region that selects the sub-region within the first region comprises a touch user selection that selects the sub-region within the first region.

18. The method of claim 13,
wherein receiving the subsequent user selection comprises receiving the subsequent user selection within the alternative version of the image content in the first region to manually control the first focus level, and
wherein controlling the first focus level comprises controlling the first focus level based on the manual controlling of the first focus level by a user.

19. The method of claim 18, further comprising outputting a histogram illustrating an amount of the image content that is closer to and an another amount of the image content that is further away from a focal point during the subsequent user selection.

20. The method of claim 18, wherein the subsequent user selection within the alternative version of the image content to manually control the first focus level comprises a swipe, slide, or drag and hold user selection to manually adjust a depth of focus.

21. The method of claim 13, wherein, based on the determination that there is image content at different depths in the first region, outputting the alternative version of the image content in the first region comprises outputting, in response to a condition being satisfied that there is image content at different depths in the first region, the alternative version of the image content in the first region.

22. The method of claim 13, outputting the alternative version of the image content in the first region comprises blurring portions of the first region that are not in focus.

23. The method of claim 13, further comprising capturing an image at the first focus level of the camera.

24. The method of claim 13, determining that there is image content at different depths in the first region comprises determining whether there is image content at different depths based on one or more of a phase detection auto focus (PDAF) based depth map, a defocus map, or time of flight (ToF).

25. A non-transitory computer-readable storage medium storing instructions thereon that when executed cause one or more processors to:
receive a first user selection to focus at a first region of a first preview image stored in a memory;
determine that there is image content at different depths in the first region;
based on the determination that there is image content at different depths in the first region, output an alternative version of the image content in the first region;
receive a subsequent user selection within the alternative version of the image content in the first region;
control a first focus level for a camera based on the subsequent user selection
receive a second user selection to focus at a second region of a second preview image stored in the memory;
determine that there is no image content at different depths at the second region; and
based on the determination that there is no image content at different depths at the second region, control a second focus level for the camera based on the second user selection.

26. The computer-readable storage medium of claim 25, wherein the instructions that cause the one or more processors to control the first focus level for the camera comprise instructions that cause the one or more processors to control a depth of focus for the camera.

* * * * *